United States Patent
Fukui et al.

(10) Patent No.: US 10,438,099 B2
(45) Date of Patent: Oct. 8, 2019

(54) PRINTING APPARATUS AND PRINTING METHOD

(71) Applicant: SCREEN HOLDINGS CO., LTD., Kyoto-shi, Kyoto (JP)

(72) Inventors: Kazuki Fukui, Kyoto (JP); Takaharu Yamamoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/878,664

(22) Filed: Jan. 24, 2018

(65) Prior Publication Data
US 2018/0239997 A1    Aug. 23, 2018

(30) Foreign Application Priority Data
Feb. 20, 2017   (JP) .................................. 2017-029177

(51) Int. Cl.
*G06K 15/02* (2006.01)
*H04N 1/00* (2006.01)
(Continued)

(52) U.S. Cl.
CPC .......... *G06K 15/1842* (2013.01); *B41J 3/543* (2013.01); *B41J 11/008* (2013.01);
(Continued)

(58) Field of Classification Search
CPC ... B41J 11/0095; B41J 11/008; B41J 11/0025; B65H 23/032; H04N 1/00068; H04N 1/00665; H04N 1/00748
See application file for complete search history.

(56) References Cited

U.S. PATENT DOCUMENTS

2008/0122889 A1*   5/2008   Naoi ...................... B41J 29/393
                                                               347/16
2009/0147286 A1*   6/2009   Yano .................. H04N 1/00002
                                                               358/1.9
(Continued)

FOREIGN PATENT DOCUMENTS

JP       2016-088654 A       5/2016

*Primary Examiner* — John Zimmermann
(74) *Attorney, Agent, or Firm* — McDermott Will & Emery LLP

(57) ABSTRACT

A printing apparatus for printing on an elongate printing medium includes the following elements: a transport mechanism for transporting the printing medium; a printing unit including a plurality of print heads arranged at intervals in a transport direction; a detecting unit including at least three detectors arranged as spaced from one another for detecting positions in a width direction of the printing medium; a variation history acquirer for deriving, for each detection cycle, a function approximate curve based on positions of the same location in the transport direction of the printing medium detected by the respective detectors, and acquiring from each function approximate curve, and as a variation history, a deviation amount in the width direction in each of the printing positions; a predicted position calculator for calculating, from the variation history, a predicted position in the width direction for each of the printing position; and a printing controller for printing while correcting the position based on the predicted position.

20 Claims, 5 Drawing Sheets

(51) Int. Cl.
*G06K 15/10* (2006.01)
*B41J 13/26* (2006.01)
*B41J 3/54* (2006.01)
*B41J 11/00* (2006.01)

(52) U.S. Cl.
CPC ........... *B41J 11/0095* (2013.01); *B41J 13/26* (2013.01); *G06K 15/102* (2013.01); *H04N 1/00037* (2013.01); *H04N 1/00058* (2013.01); *H04N 1/00068* (2013.01); *H04N 1/0071* (2013.01); *H04N 1/00082* (2013.01); *H04N 1/00665* (2013.01); *H04N 1/00718* (2013.01); *H04N 1/00748* (2013.01); *G06K 2215/101* (2013.01)

(56) References Cited

U.S. PATENT DOCUMENTS

| | | | |
|---|---|---|---|
| 2012/0240803 A1* | 9/2012 | Sato | B41J 11/42 101/485 |
| 2013/0266358 A1* | 10/2013 | Nowak | B65H 7/20 400/621 |
| 2016/0121627 A1 | 5/2016 | Yoshida et al. | |
| 2016/0155056 A1* | 6/2016 | Shiozaki | G06N 99/005 706/52 |
| 2016/0214413 A1* | 7/2016 | Sato | B41J 11/0095 |

* cited by examiner

PRINTING APPARATUS AND PRINTING METHOD

BACKGROUND OF THE INVENTION (1) Field of the Invention

This invention relates to a printing apparatus and a printing method for printing on an elongate printing medium while transporting the printing medium, and more particularly to a technique for correcting a printing position in a direction perpendicular to a transport direction of the printing medium.

(2) Description of the Related Art

Conventionally, as this type of apparatus there exists an inkjet printing apparatus including a transport mechanism for transporting elongate web paper along a transport path, a plurality of print heads arranged at intervals over the transport path for dispensing ink droplets, edge sensors arranged upstream and downstream of each print head for detecting positions of an edge of the web paper, and a controller operable based on signals from the respective edge sensors for correcting dispense positions of the ink droplets in a direction perpendicular to the transport direction of the web paper (see Japanese Unexamined Patent Publication No. 2016-88654, for example).

With the printing apparatus having such a construction, skewing or meandering is a common phenomenon occurring at the time of transporting the web paper, whereby edge positions of the web paper become displaced in the direction perpendicular to the transport direction. Consequently, with the most upstream print head serving as reference, the ink droplets dispensed from each subsequent print head disposed downstream will shift in the direction perpendicular to the transport direction in response to the displacement of the edge positions of the web paper. Since print quality lowers as a result, the controller determines inking positions by means of linear interpolation based on the signal from each edge sensor, and form prints by shifting the dispense positions of ink droplets in the direction perpendicular to the transport direction.

In Japanese Unexamined Patent Publication No. 2016-88654, the edge sensors are arranged upstream and downstream of each print head, which results in high apparatus cost. Thus, a construction with a reduced number of edge sensors has been proposed (see FIG. 7 of Japanese Unexamined Patent Publication No. 2016-88654).

However, the conventional example having such construction has the following problem.

The conventional apparatus has a reduced number of edge sensors, which lowers the accuracy of inking positions obtained through linear interpolation. Consequently, print positions cannot be corrected appropriately, hence the problem of low print quality.

SUMMARY OF THE INVENTION

This invention has been made having regard to the state of the art noted above, and its object is to provide a printing apparatus and a printing method which, although the number of detectors arranged for detecting positions of a printing medium is lessened, can make correction with high accuracy, thereby to maintain high print quality.

To fulfill the above object, this invention provides the following construction.

A printing apparatus for printing on an elongate printing medium, according to this invention, comprises a transport mechanism for transporting the printing medium along a transport path; a printing unit including a plurality of print heads arranged at intervals in a transport direction of the printing medium for printing on the medium in printing positions on the transport path; a detecting unit including at least three detectors arranged as spaced from one another for detecting positions in a width direction of the printing medium; a variation history acquirer for deriving from results of detection by the detecting unit, and for each detection cycle of the detecting unit, a function approximate curve based on positions of the same location in the transport direction of the printing medium detected by the respective detectors, and acquiring from each function approximate curve, and as a variation history, a deviation amount in the width direction in each of the printing positions; a predicted position calculator for calculating, from the variation history, a predicted position in the width direction of the printing medium for each of the printing positions; and a printing controller for causing each of the print heads to print on the printing medium while correcting the position in the width direction based on the predicted position.

According to this invention, the variation history acquirer obtains, for every detection cycle, a function approximate curve based on the positions of the same location in the transport direction of the printing medium detected by the detectors of the detecting unit, and acquires from each function approximate curve a deviation amount in the width direction of each printing position as a variation history. Based on each function approximate curve acquired, the predicted position calculator calculates a predicted position of each printing position in the width direction of the printing medium. The printing controller executes printing on the printing medium by means of each print head while correcting the positions in the width direction based on the predicted positions. Since, as described above, the predicted position calculator calculates the predicted positions based on the variation history with high positional accuracy obtained from the function approximate curves, the predicted positions to which the printing medium deviates in the width direction can be obtained with high accuracy. As a result, while the arranged number of detectors is reduced, correction can be made with excellent accuracy to maintain high printing quality.

In this invention, it is preferred that the predicted position calculator calculates the predicted position by using Yule-Walker's equation, based on a past deviation amount in the variation history, a primary differential of the deviation amount and/or a quadratic differential of the deviation amount.

Since the predicted position is calculated by using Yule-Walker's equation, based on a past deviation amount in the variation history, a primary differential of the deviation amount and/or a quadratic differential of the deviation amount, the predicted position can be obtained with high accuracy from the variation history, even when the deviation amount has an amplitude or a phase varying in a vibrating manner.

In this invention, it is preferred that the detecting unit has a most downstream one of the detectors disposed upstream of a most downstream one of the print heads of the printing unit; and the predicted position calculator calculates the predicted position for the most downstream one of the print heads by extrapolation.

The variation history based on the function approximate curves can provide, by extrapolation, the predicted position of a print head not between the detectors but downstream of the detectors. Thus, even when a print head is added in the most downstream position to an existing apparatus, the above construction serves the purpose without an additional detector.

In this invention, it is preferred that the detecting unit has a most upstream one of the detectors disposed downstream of a most upstream one of the print heads of the printing unit; and the predicted position calculator calculates the predicted position for the most upstream one of the print heads by extrapolation.

The variation history based on the function approximate curves can provide, by extrapolation, the predicted position of a print head not between the detectors but upstream of the detectors. Thus, even when a print head is added in the most upstream position to an existing apparatus, the above construction serves the purpose without an additional detector.

A printing method for printing on an elongate printing medium, according to this invention, comprises a variation history acquiring step for deriving, from results of detection by a detecting unit including at least three detectors arranged as spaced from one another for detecting positions in a width direction of the printing medium, the detectors being arranged along with a printing unit including a plurality of print heads arranged at intervals in a transport direction of the printing medium, and for each detection cycle of the detecting unit, a function approximate curve based on positions of the same location in the transport direction of the printing medium detected by the respective detectors, and acquiring from each function approximate curve, and as a variation history, a deviation amount in the width direction in each of the printing positions; a predicted position calculating step for calculating, from the variation history, a predicted position in the width direction of the printing medium for each of the printing positions; and a printing step for causing each of the print heads to print on the printing medium while correcting the position in the width direction based on the predicted position.

According to this invention, the variation history acquiring step obtains, for every detection cycle, a function approximate curve based on the positions of the same location in the transport direction of the printing medium detected by the detectors of the detecting unit, and acquires from each function approximate curve a deviation amount in the width direction of each printing position as a variation history. Based on each function approximate curve, the predicted position calculating step calculates a predicted position of each printing position in the width direction of the printing medium. Next, the printing step executes printing on the printing medium by means of each print head while correcting the positions in the width direction based on the predicted positions. Since, as described above, the predicted position calculating step calculates the predicted positions based on the variation history with high positional accuracy obtained from the function approximate curves, the predicted positions to which the printing medium deviates in the width direction can be obtained with high accuracy. As a result, while the arranged number of detectors is reduced, correction can be made with excellent accuracy to maintain high printing quality.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

An embodiment of this invention will be described hereinafter with reference to the drawings.

Figure 1:
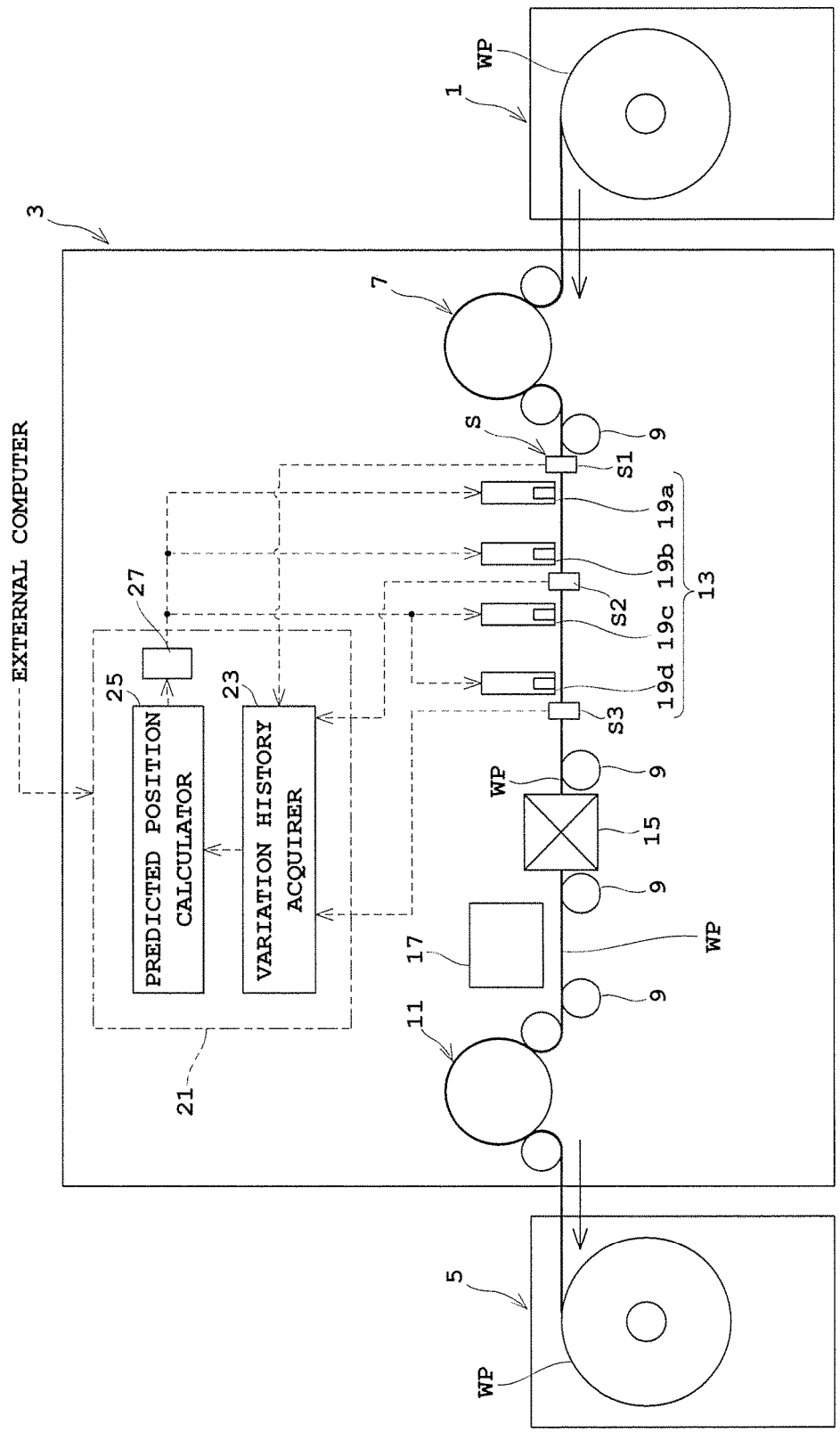
FIG. 1 is an outline view showing an entire inkjet printing system according to an embodiment.

FIG. 1 is a schematic view showing an entire inkjet printing system according to the embodiment.

The inkjet printing system according to this embodiment includes a paper feeder 1, an inkjet printing apparatus 3 and a takeup roller 5.

The paper feeder 1 holds elongate web paper WP in a roll form to be rotatable about a horizontal axis, and unwinds the web paper WP and feeds it to the inkjet printing apparatus 3. The takeup roller 5 winds up the web paper WP printed by the inkjet printing apparatus 3 about a horizontal axis. Regarding the side from which the web paper WP is fed as upstream and the side to which the web paper WP is discharged as downstream, the paper feeder 1 is disposed upstream of the inkjet printing apparatus 3 while the takeup roller 5 is disposed downstream of the inkjet printing apparatus 3.

The inkjet printing apparatus 3 includes a drive roller 7 disposed in an upstream position for taking in the web paper WP from the paper feeder 1. The web paper WP unwound from the paper feeder 1 by the drive roller 7 is transported downstream along a plurality of transport rollers 9 toward the takeup roller 5. A drive roller 11 is disposed between the most downstream transport roller 9 and the takeup roller 5. This drive roller 11 feeds the web paper WP transported on the transport rollers 9 forward toward the takeup roller 5.

The above inkjet printing apparatus 3 corresponds to the "printing apparatus" in this invention. The web paper WP corresponds to the "printing medium" in this invention. The transport rollers 9 correspond to the "transport mechanism" in this invention.

The inkjet printing apparatus 3 has a printing unit 13, a drying unit 15 and an inspecting unit 17 arranged in the stated order from upstream between the drive roller 7 and drive roller 11. The drying unit 15 dries portions printed by the printing unit 13. The inspecting unit 17 checks whether the printed portions have stains, omissions or other defects.

The printing unit 13 has, for example, four print heads 19 arranged along the transport direction of web paper WP. Each print head 19 dispenses ink droplets to the web paper WP transported by the transport rollers 9.

In this embodiment, each print head 19 is called print head 19a, print head 19b, print head 19c or print head 19d in order from upstream. When these four print heads 19 need to be individually distinguished, small letters of the alphabet are affixed to sign 19 as above. The print heads 19a-19d are arranged at predetermined intervals in the transport direction. Each print head 19 includes a plurality of nozzles (not shown) for dispensing ink droplets. The plurality of nozzles are formed over a range at least corresponding to an entire width of the web paper WP to be able to dispense ink droplets to the entire width of the web paper WP even when the web paper WP makes skews or meanders.

These print heads 19a-19d dispense ink droplets of at least two colors to be capable of multicolor printing on the web paper WP. In this embodiment, for example, the print head 19a dispenses ink droplets in black (K), the print head 19b in cyan (C), the print head 19c in magenta (M), and the print head 19d in yellow (Y).

The printing unit 13 is accompanied by a detecting unit S. The detecting unit S includes three sensors S1-S3. These sensors S1-S3 detect positions in a width direction of the web paper WP. In this embodiment, the sensors S1-S3 are arranged at an end in the width direction of the transport path of the web paper WP for detecting positions in the width direction of a side edge surface of the web paper WP. The sensor S1 is disposed upstream of the most upstream print head 19a. The sensor S2 is disposed between the print head 19b and print head 19c. The sensor S3 is disposed downstream of the most downstream print head 19d.

The above sensors S1-S3 correspond to the "detectors" in this invention.

The inkjet printing apparatus 3 has a controller 21 which performs overall control of the components described above. The controller 21 has a CPU, memory, and so on not shown, receives from an external computer print data which is data of images to be recorded on the web paper WP, and controls the above-noted components based on the print data. The controller 21 includes a variation history acquirer 23, a predicted position calculator 25, and a printing controller 27.

Figure 2:
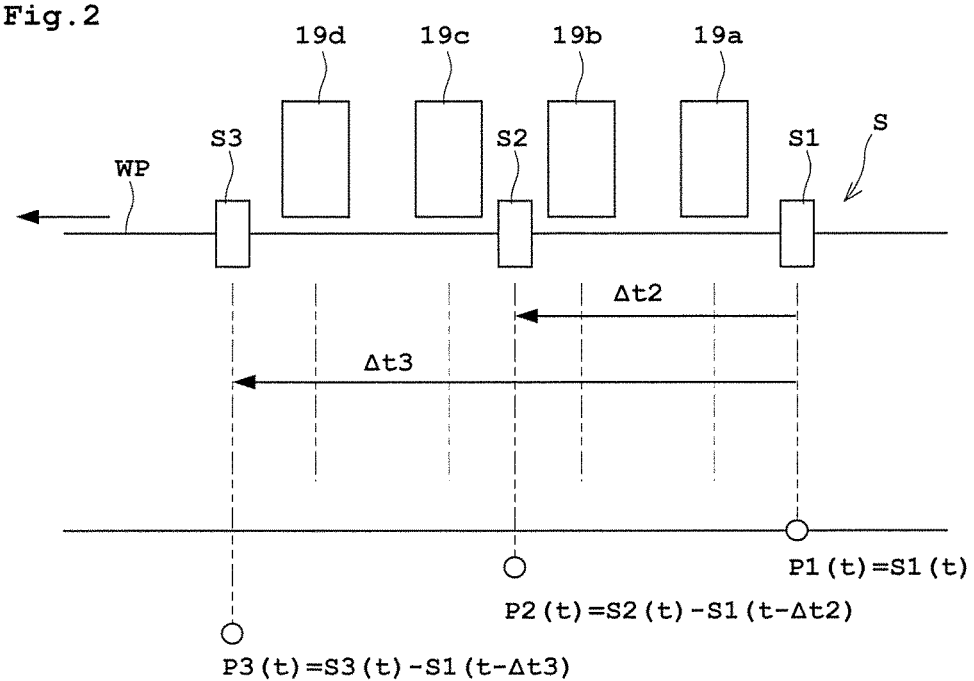
FIG. 2 is a schematic view showing a positional relationship between print heads and detectors.
Figure 3:
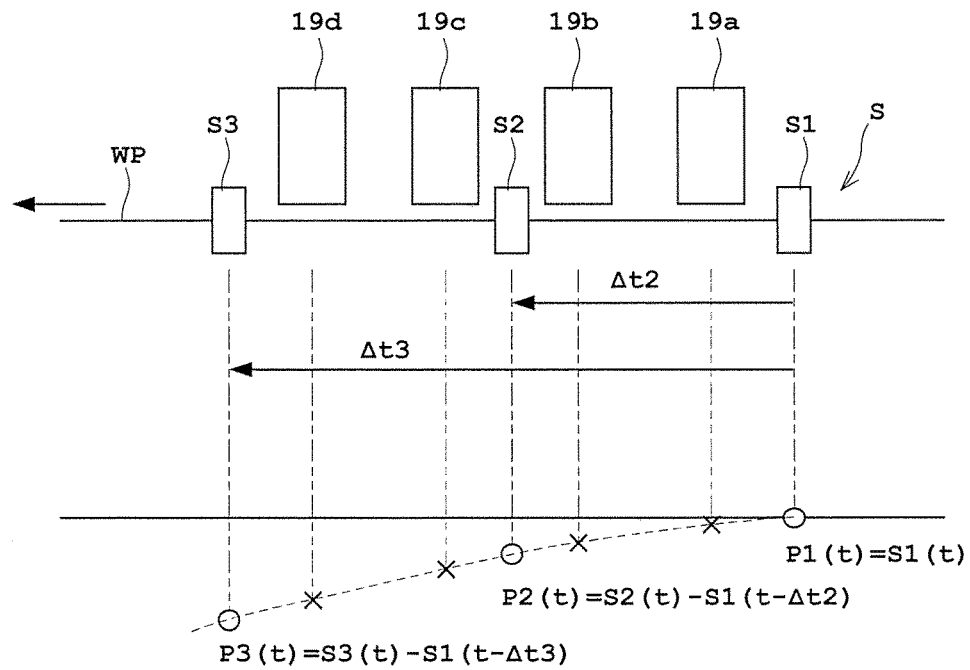
FIG. 3 is a view illustrating how a function approximate curve is obtained.
Figure 4:
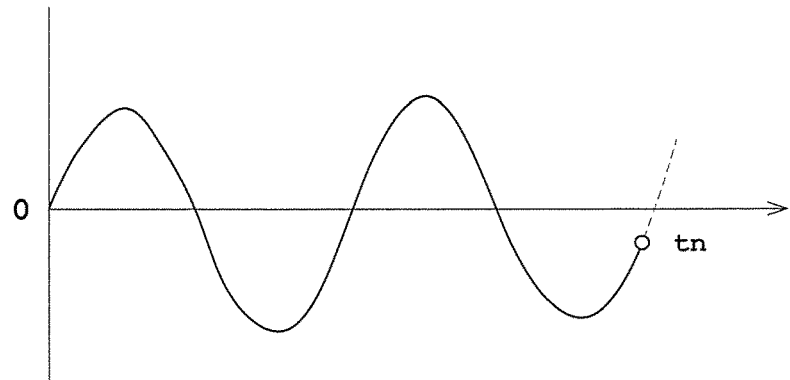
FIG. 4 is a schematic view showing an example of variation history.

Reference is now made to FIGS. 2-4. FIG. 2 is a schematic view showing a positional relationship between print heads and detectors. FIG. 3 is a view illustrating how a function approximate curve is obtained. FIG. 4 is a schematic view showing an example of variation history.

The above sensors S1-S3 are in the positional relationship shown in FIG. 2. It is assumed here that the printing positions in the width direction of the print heads 19b-19d are to be corrected with reference to the most upstream print head 19a. Assume here that, at a certain constant transport speed, and with regard to positions of the same location of the web paper WP, a time lag between the detections by the sensor S1 and sensor S2 is set to $\Delta t2$, and a time lag between the sensor S1 and sensor S3 is set to $\Delta t3$. Thus, where the output of sensor S1 at time t is set to $S1(t)$, the output of sensor S2 to $S2(t)$, and the output of sensor S3 to $S3(t)$, the positions (deviation amounts) of the same location of the web paper WP detected by the sensors S1-S3 are expressed as follows:

Position $P1(t)=S1(t)$

Position $P2(t)=S2(t)-S1(t-\Delta t2)$

Position $P3(t)=S3(t)-S1(t-\Delta t3)$

The variation history acquirer 23, based on the detection results by the detecting unit S, calculates the positions of the same location of the web paper WP detected by the sensors S1-S3 from the above equations (FIG. 2). Then, the variation history acquirer 23 obtains a function approximate curve (shown in a dotted line in FIG. 3) approximated with a quadratic or higher-order function to pass through the positions P1-P3. Such function approximate curve is obtained for every detection cycle by the detecting unit S. Based on each function approximate curve, deviation amounts in the width direction of the printing positions (cross marks in FIG. 3) of the print heads 19 with reference to the print head 19a are acquired as variation history records (FIG. 4). FIG. 4 illustrates the case where the deviation amount of the print head 19d which dispenses ink droplets in yellow (Y) is calculated as a variation history with reference to the printing position of the print head 19a which dispenses ink droplets in black (B).

The predicted position calculator 25, based on the variation history, calculates predicted positions in the width direction for the printing positions of the print heads 19b-19d relative to the print head 19a. At this time, the predicted position calculator 25 preferably uses Yule-Walker's equation set out as the following equation (1):

order of prediction coefficient $p$ prediction coefficient $a(i)$ ($i = 1, 2, 3, \ldots, p$)

past signal value: $x(n)$ predicted value of signal:

$$x(n) = -a(1)x(n-1) - a(2)x(n-2) - \ldots - a(p)x(n-p)$$

$$\begin{bmatrix} r(1) & r(2)\text{※} & \ldots & r(p)\text{※} \\ r(2) & r(1) & \ddots & \vdots \\ \vdots & \ddots & \ddots & r(2)\text{※} \\ r(p) & \ldots & r(2) & r(1) \end{bmatrix} \begin{bmatrix} a(1) \\ a(2) \\ \vdots \\ a(p) \end{bmatrix} = \begin{bmatrix} -r(1) \\ -r(2) \\ \vdots \\ -r(p) \end{bmatrix}$$

※ $r(i)$: autocorrelation of $x$

That is, the predicted position calculator 25 adds a primary differential (gradient) of the deviation amount and a quadratic differential (acceleration) of the deviation amount to a past deviation amount (past signal value) in the variation history multiplied by a coefficient, to calculate a predicted position in the form of $\alpha \times x(n-1) + \beta \times x'(n-1) + \gamma \times x''(n-1) + \Delta \times x'''(n-1) + \ldots$, thereby to increase accuracy.

The printing controller 27 executes printing while correcting the printing positions in the width direction of the respective print heads 19b-19d based on the predicted positions received from the predicted position calculator 25. When, at this time, a predicted position happens to be between two nozzles formed on each print head 19, the printing controller 27 may dispense ink droplets from the nozzle nearest to the predicted position among the plurality of nozzles formed on each print head 19. Preferably, weighting is carried out, and ink droplets of different sizes are dispensed from a plurality of nozzles around the above nearest nozzle as well as the nearest nozzle, so that dots will be visually located between the nozzles.

Figure 5:
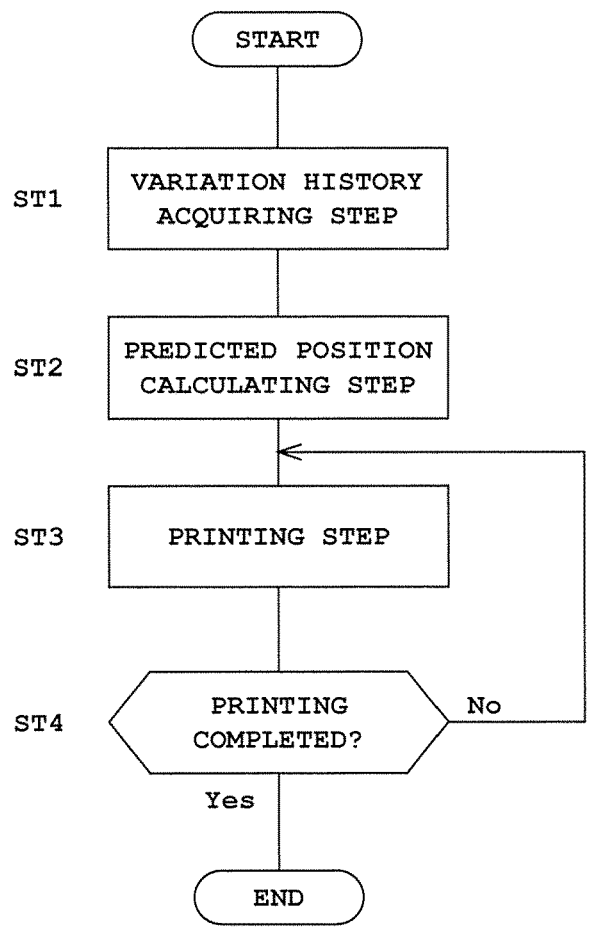
FIG. 5 is a flow chart showing an example of operation.

Next, operation of the inkjet printing system having the above construction will be described with reference to FIG. 5. FIG. 5 is a flow chart showing an example of operation.

Step ST1 (Variation History Acquiring Step)

The controller 21 causes the variation history acquirer 23 to acquire the variation history. This variation history acquiring step is repeatedly executed for every detection cycle by the sensors S1-S3 until completion of the printing.

Step ST2 (Predicted Position Calculating Step)

The controller 21 causes the predicted position calculator 25 to calculate a predicted position in the width direction of each printing position. This predicted position calculating step is repeatedly executed for every detection cycle by the sensors S1-S3 until completion of the printing.

Step ST3 (Printing Step)

The controller 21 causes the printing controller 27 to execute printing while correcting the printing positions in the width direction of the respective print heads 19b-19d based on the predicted positions successively calculated by the predicted position calculator 25.

Step ST4

The controller 21 determines whether or not to terminate the printing based on the print data from the external computer. When the printing is to be continued, the operation returns to step ST3 to continue with the printing. Otherwise, the printing process is terminated.

Figure 6:
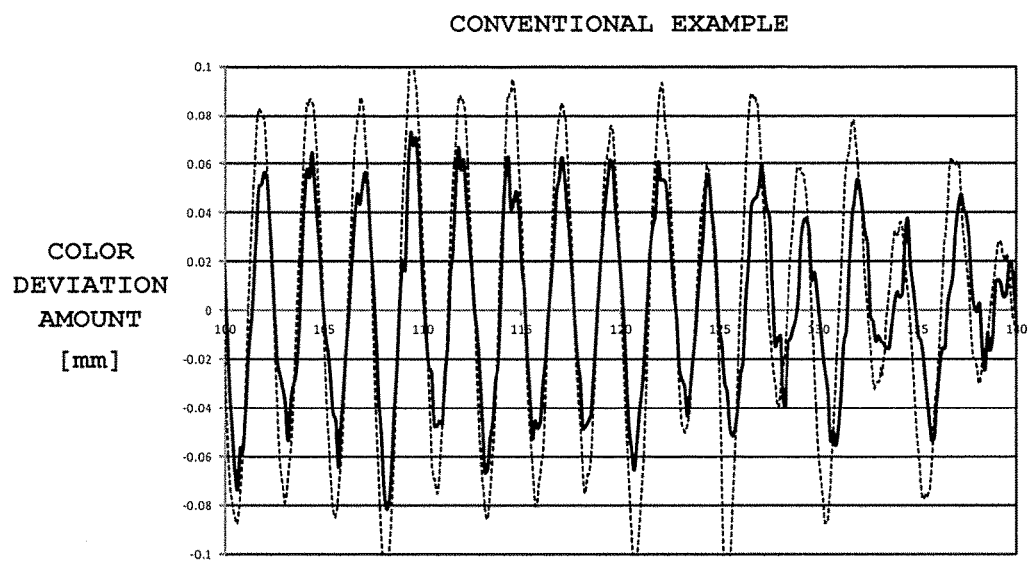
FIG. 6 is a graph showing an example of color deviation amount in a conventional example.
Figure 7:
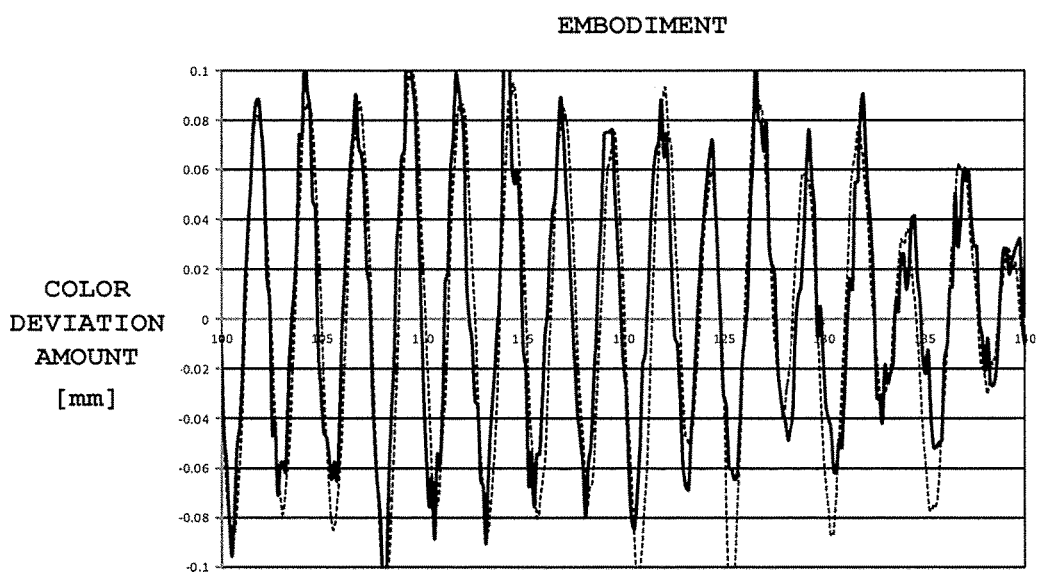
FIG. 7 is a graph showing an example of color deviation amount in the embodiment.

An advantage of this embodiment over a conventional example will now be described with reference to FIGS. 6 and 7. FIG. 6 is a graph showing an example of color deviation amount in the conventional example. FIG. 7 is a graph showing an example of color deviation amount in this embodiment. The conventional example has a construction including three sensors as in FIG. 7 of Japanese Unexamined Patent Publication No. 2016-88654, and linear interpolation is carried out for positions detected by these sensors.

The dotted lines in FIGS. 6 and 7 represent color deviation amounts of the print head 19a for black (K) and print head 19d for yellow (Y) measured with a camera. The solid lines show the predicted positions calculated. The solid lines overlapping the dotted lines to a larger extent indicate better predicted positions calculated. It will be seen clearly from FIGS. 6 and 7 that the accuracy of the predicted positions in this embodiment is markedly improved over that in the conventional example.

According to this embodiment, the variation history acquirer 23 obtains, for every detection cycle, a function approximate curve based on the positions of the same location in the transport direction of the web paper WP detected by the sensors S1-S3 of the detecting unit S, and acquires from each function approximate curve a deviation amount in the width direction of each printing position as a variation history. Based on each function approximate curve acquired, the predicted position calculator 25 calculates a predicted position of each printing position in the width direction of the printing medium. The printing controller 27 executes printing on the web paper WP by means of each print head while correcting the positions in the width direction based on the predicted positions. Since, as described above, the predicted position calculator 25 calculates the predicted positions based on the variation history with high positional accuracy obtained from the function approximate curves, the predicted positions to which the web paper WP deviates in the width direction can be obtained with high accuracy. As a result, while the arranged number of sensors S1-S3 is reduced, correction can be made with excellent accuracy to maintain high printing quality.

The predicted position calculator 25, since it calculates the predicted position based not only on a past deviation amount but on the past deviation amount, a primary differential, and a quadratic differential, can obtain the predicted position with high accuracy from the variation history, even when the deviation amount has an amplitude or a phase varying in a vibrating manner.

This invention is not limited to the foregoing embodiment, but may be modified as follows:

(1) In the foregoing embodiment, the sensors S1-S3 are arranged for the four print heads 19a-19d such that one is disposed upstream of the print head 19a, one between the print head 19b and print head 19c, and one downstream of the print head 19d. This invention is not limited to such construction. This invention needs to have three or more sensors, and is not limited to the foregoing embodiment regarding the number of print heads, the number of sensors, or the arrangement of the sensors. In this invention, the number of sensors may be less than the number of print heads. For example, the conventional construction having sensors arranged upstream and downstream of each print head requires four sensors where three print heads are provided. However, three sensors are sufficient for the purpose of this invention.

Figure 8:
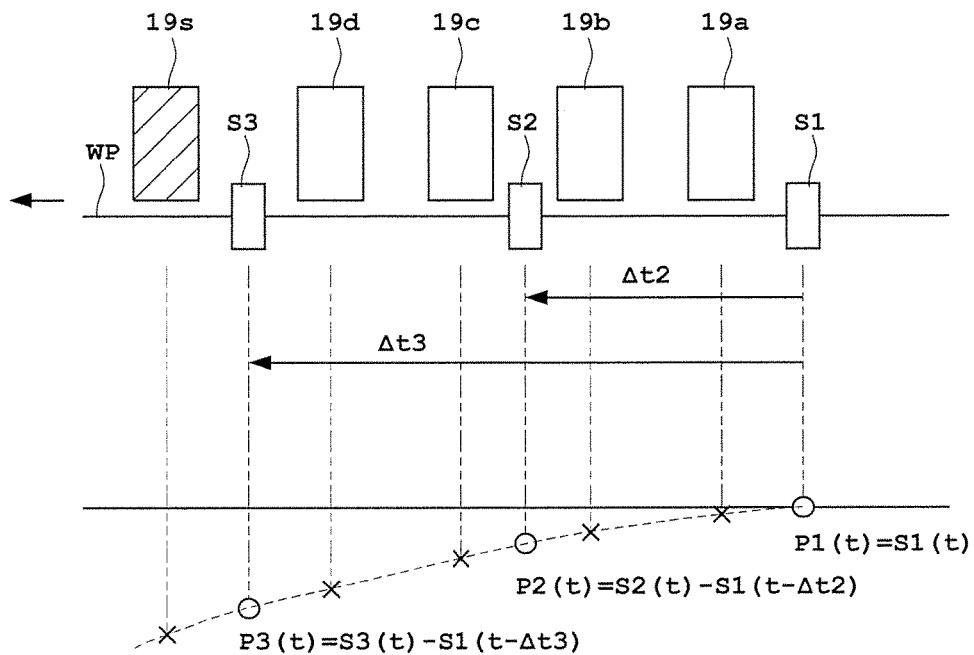
FIG. 8 is a schematic view showing a positional relationship between print heads and detectors in a first modification.

(2) In the foregoing embodiment, the construction is such that the four print heads 19a-19d are arranged between the first sensor S1 and the third sensor S3. This invention is not limited to such construction. Since this invention executes approximation with the function approximate curve, the predicted positions can be obtained with higher accuracy than by straight-line approximation. Therefore, even with a construction as shown in FIG. 8, for example, which includes an additional print head 19s downstream of the print head 19d and the third sensor S3, a predicted position in the width direction of the printing position of print head 19s can be obtained with high accuracy by extrapolation. This produces the same effect as the foregoing embodiment.

That is, the print head 19s can be added when it is desired to use ink droplets in a special color such as red, green, blue or gold, or a functional ink such as overcoat or magnetic material, besides the ink droplets in black (K), cyan (C), magenta (M) and yellow (Y) dispensed from the four print heads 19a-19d. In this case, the print head 19s is disposed downstream of the third sensor S3, and a predicted position in the width direction of the printing position of print head 19s can be obtained with high accuracy by extrapolation. Consequently, there is no need to provide an additional sensor.

Figure 9:
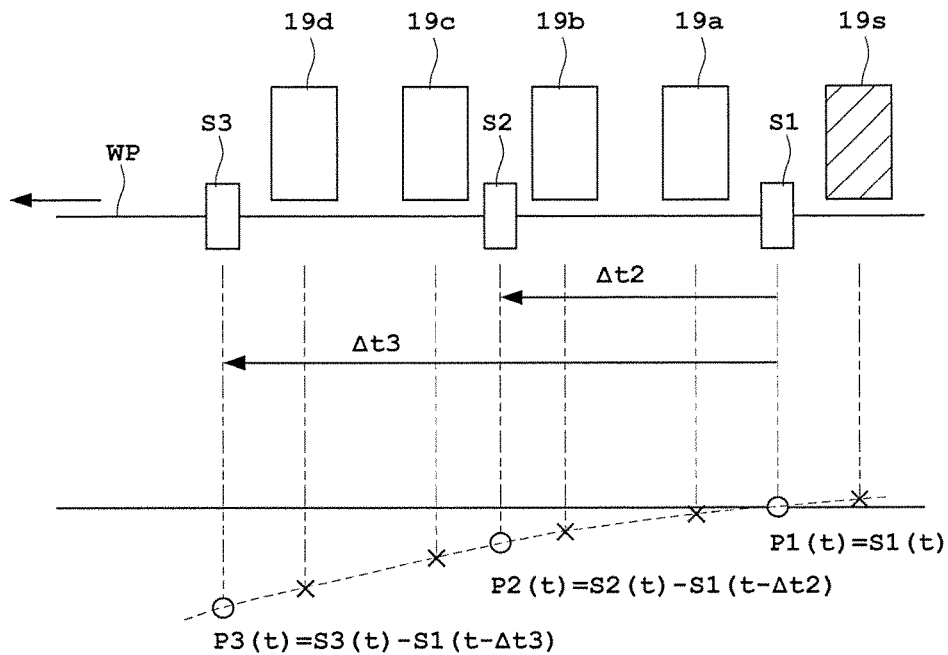
FIG. 9 is a schematic view showing a positional relationship between print heads and detectors in a second modification.

Similarly, even with a construction as shown in FIG. 9, which includes an additional print head 19s upstream of the print head 19a and the first sensor S1, a predicted position in the width direction of the printing position of print head 19s can be obtained with high accuracy by extrapolation.

(3) In the foregoing embodiment, the predicted position calculator 25 adds both a primary differential (gradient) of the deviation amount and a quadratic differential (acceleration) of the deviation amount to a past deviation amount (past signal value) in the variation history multiplied by a coefficient. However, for example, only a primary differential (gradient) of the deviation amount may be added to a past deviation amount (past signal value) in the variation history multiplied by a coefficient. Or only a quadratic differential (acceleration) of the deviation amount may be added to a past deviation amount (past signal value) in the variation history multiplied by a coefficient.

(4) In the foregoing embodiment, the sensors S1-S3 detect positions of the side edge surface of the web paper WP. This invention is not limited to such sensors S1-S3. For example, a mark printed in a predetermined position of the web paper WP may be detected to obtain positions in the width direction of the web paper WP.

(5) The foregoing embodiment has been described taking the inkjet printing apparatus 3 for example. This invention is applicable also to various types of printing apparatus having print heads arranged as spaced from one another in the transport direction. Further, the invention is not limited to the inkjet type, but may be other types of apparatus constructed to transport an elongate printing medium and including a printing unit with print heads arranged as spaced from one another in the transport direction.

(6) In the foregoing embodiment, the web paper WP has been taken as an example of printing medium of the inkjet printing apparatus 3. This invention is not limited to the web paper WP as the printing medium, but is also applicable where the printing medium is film, for example.

This invention may be embodied in other specific forms without departing from the spirit or essential attributes thereof and, accordingly, reference should be made to the appended claims, rather than to the foregoing specification, as indicating the scope of the invention.

What is claimed is:

1. A printing apparatus for printing on an elongate printing medium, comprising:
   a transport mechanism for transporting the printing medium along a transport path;
   a printing unit including a plurality of print heads arranged at intervals in a transport direction of the printing medium for printing on the medium in printing positions on the transport path;
   a detecting unit including at least three detectors arranged as spaced from one another for detecting positions in a width direction of the printing medium;
   a variation history acquirer for deriving from results of detection by the detecting unit, and for each detection cycle of the detecting unit, a function approximate curve based on positions of the same location in the transport direction of the printing medium detected by the respective detectors, calculating from each function approximate curve a deviation amount in the width direction in each of the printing positions, and acquiring a variation history of the deviation amount in the width direction in each of the printing positions calculated from each function approximate curve;
   a predicted position calculator for calculating, from the variation history, a predicted position in the width direction of the printing medium for each of the printing positions; and
   a printing controller for causing each of the print heads to print on the printing medium while correcting the position in the width direction based on the predicted position.

2. The printing apparatus according to claim 1, wherein the predicted position calculator calculates the predicted position by using Yule-Walker's equation, based on a past deviation amount in the variation history, a primary differential of the deviation amount and/or a quadratic differential of the deviation amount.

3. The printing apparatus according to claim 1, wherein:
   the detecting unit has a most downstream one of the detectors disposed upstream of a most downstream one of the print heads of the printing unit; and
   the predicted position calculator calculates the predicted position for the most downstream one of the print heads by extrapolation.

4. The printing apparatus according to claim 2, wherein:
   the detecting unit has a most downstream one of the detectors disposed upstream of a most downstream one of the print heads of the printing unit; and
   the predicted position calculator calculates the predicted position for the most downstream one of the print heads by extrapolation.

5. The printing apparatus according to claim 1, wherein:
   the detecting unit has a most upstream one of the detectors disposed downstream of a most upstream one of the print heads of the printing unit; and
   the predicted position calculator calculates the predicted position for the most upstream one of the print heads by extrapolation.

6. The printing apparatus according to claim 2, wherein:
   the detecting unit has a most upstream one of the detectors disposed downstream of a most upstream one of the print heads of the printing unit; and
   the predicted position calculator calculates the predicted position for the most upstream one of the print heads by extrapolation.

7. The printing apparatus according to claim 1, wherein the detectors detect positions in the width direction of a side edge surface of the printing medium.

8. The printing apparatus according to claim 2, wherein the detectors detect positions in the width direction of a side edge surface of the printing medium.

9. The printing apparatus according to claim 3, wherein the detectors detect positions in the width direction of a side edge surface of the printing medium.

10. The printing apparatus according to claim 4, wherein the detectors detect positions in the width direction of a side edge surface of the printing medium.

11. The printing apparatus according to claim 5, wherein the detectors detect positions in the width direction of a side edge surface of the printing medium.

12. The printing apparatus according to claim 6, wherein the detectors detect positions in the width direction of a side edge surface of the printing medium.

13. A printing method for printing on an elongate printing medium, comprising:
   a variation history acquiring step for deriving, from results of detection by a detecting unit including at least three detectors arranged as spaced from one another for detecting positions in a width direction of the printing medium, the detectors being arranged along with a printing unit including a plurality of print heads arranged at intervals in a transport direction of the printing medium, and for each detection cycle of the detecting unit, a function approximate curve based on positions of the same location in the transport direction of the printing medium detected by the respective detectors, calculating from each function approximate curve a deviation amount in the width direction in each of the printing positions, and acquiring a variation history of the deviation amount in the width direction in each of the printing positions calculated from each function approximate curve;
   a predicted position calculating step for calculating, from the variation history, a predicted position in the width direction of the printing medium for each of the printing positions; and
   a printing step for causing each of the print heads to print on the printing medium while correcting the position in the width direction based on the predicted position.

14. The printing method according to claim 13, wherein the predicted position calculating step calculates the predicted position by using Yule-Walker's equation, based on a past deviation amount in the variation history, a primary differential of the deviation amount and/or a quadratic differential of the deviation amount.

15. The printing method according to claim 13, wherein:
the detecting unit has a most downstream one of the detectors disposed upstream of a most downstream one of the print heads of the printing unit; and
the predicted position calculating step calculates the predicted position for the most downstream one of the print heads by extrapolation.

16. The printing method according to claim 14, wherein:
the detecting unit has a most downstream one of the detectors disposed upstream of a most downstream one of the print heads of the printing unit; and
the predicted position calculating step calculates the predicted position for the most downstream one of the print heads by extrapolation.

17. The printing method according to claim 13, wherein:
the detecting unit has a most upstream one of the detectors disposed downstream of a most upstream one of the print heads of the printing unit; and
the predicted position calculating step calculates the predicted position for the most upstream one of the print heads by extrapolation.

18. The printing method according to claim 14, wherein:
the detecting unit has a most upstream one of the detectors disposed downstream of a most upstream one of the print heads of the printing unit; and
the predicted position calculating calculates the predicted position for the most upstream one of the print heads by extrapolation.

19. The printing method according to claim 13, wherein the detectors detect positions in the width direction of a side edge surface of the printing medium.

20. The printing method according to claim 14, wherein the detectors detect positions in the width direction of a side edge surface of the printing medium.

* * * * *